(12) United States Patent
Hendewerk et al.

(10) Patent No.: US 6,270,856 B1
(45) Date of Patent: *Aug. 7, 2001

(54) ELECTRICAL CABLES HAVING POLYMERIC COMPONENTS

(75) Inventors: Monica Louise Hendewerk, Houston; Aspy Keki Mehta, Humble; Lawrence Spenadel, League City, all of TX (US)

(73) Assignee: Exxon Mobil Chemical Patents Inc., Baytown, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,638

(22) Filed: May 9, 1997

Related U.S. Application Data

(63) Continuation of application No. 08/625,451, filed on Mar. 29, 1996, now abandoned, which is a continuation of application No. 08/473,377, filed on Jun. 7, 1995, now abandoned, which is a division of application No. 08/304,039, filed on Sep. 9, 1994, now abandoned, which is a division of application No. 08/025,015, filed on Mar. 2, 1993, now abandoned, which is a continuation-in-part of application No. 07/745,479, filed on Aug. 15, 1991, now Pat. No. 5,246,783.

(51) Int. Cl.⁷ ...................................................... B05D 7/20
(52) U.S. Cl. ........................ 427/487; 427/117; 427/388.2
(58) Field of Search ............................... 427/487, 388.1, 427/388.2, 117

(56) References Cited

U.S. PATENT DOCUMENTS

| | | | |
|---|---|---|---|
| 4,276,251 | 6/1981 | Bopp | 264/174 |
| 4,549,041 | 10/1985 | Shingo et al. | 174/113 R |
| 4,769,514 | 9/1988 | Uematsu et al. | 174/102 A |
| 4,791,160 | 12/1988 | Kato et al. | 524/322 |
| 4,812,505 | * 3/1989 | Topcik | 524/377 |
| 4,997,713 | * 3/1991 | Koehnlein | 428/379 |

FOREIGN PATENT DOCUMENTS

| | | |
|---|---|---|
| 7842813 | 7/1979 | (AU). |
| 3312794 | 10/1984 | (DE). |
| 3430184 | 3/1985 | (DE). |
| 340785 | 11/1989 | (EP). |
| 341644 | 11/1989 | (EP). |
| 410431 | 1/1991 | (EP). |
| 90/03414 | 4/1990 | (WO). |

* cited by examiner

Primary Examiner—Erma Cameron
(74) Attorney, Agent, or Firm—Jaime Sher; Frank E. Reid; Stephen D. Prodnuk

(57) ABSTRACT

The invention relates to electric power cables, transmission lines or coaxial cables having at least one polymeric component. This polymeric component generally is a conducting, semiconducting, protective or insulating component. The electrical cables of this invention have improved resistance to water treeing and other improved properties. The polymer generally comprises ethylene polymerized with at least one $C_3$ to $C_{20}$ alpha-olefin and optionally at least one $C_3$ to $C_{20}$ polyene. The polymer utilized has a density in the range of about 0.86 g/cm³ to about 0.96 g/cm³, a melt index in the range of about 0.2 dg/min. to about 100 dg/min., a molecular weight distribution in the range of about 1.5 to about 30, and a composition distribution breadth index greater than about 45 percent.

10 Claims, 3 Drawing Sheets

ANALYSIS OF TREE RETARDANCY TEST SAMPLES

SANDBLASTED AREAS TO
INITIATE TREE GROWTH

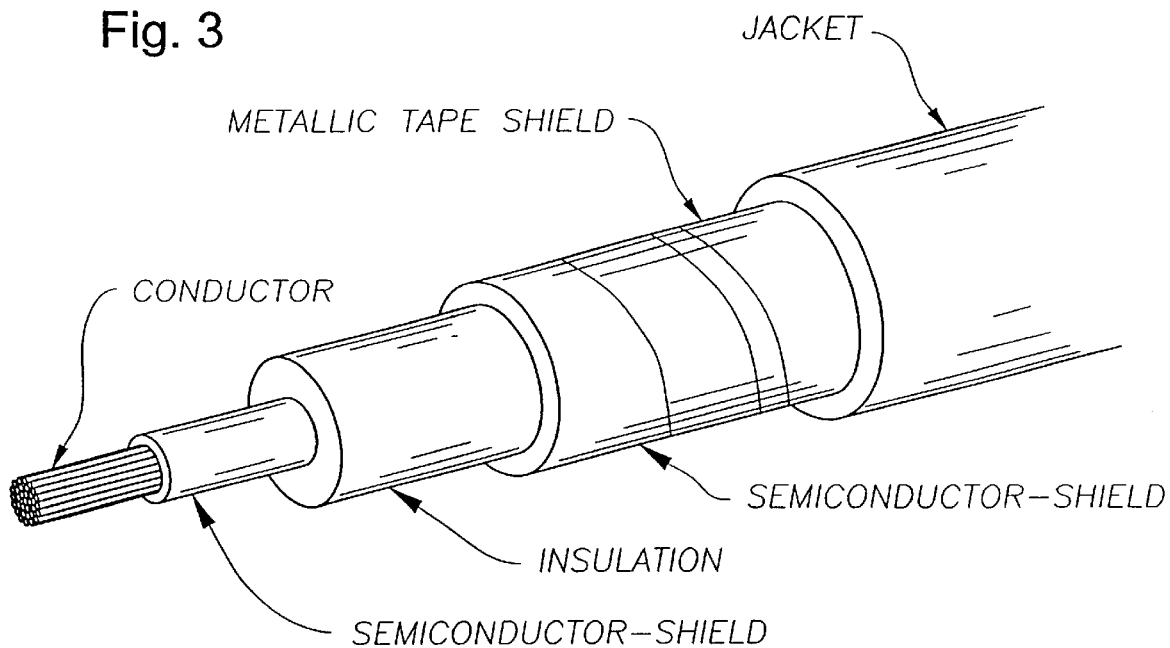
Fig. 3
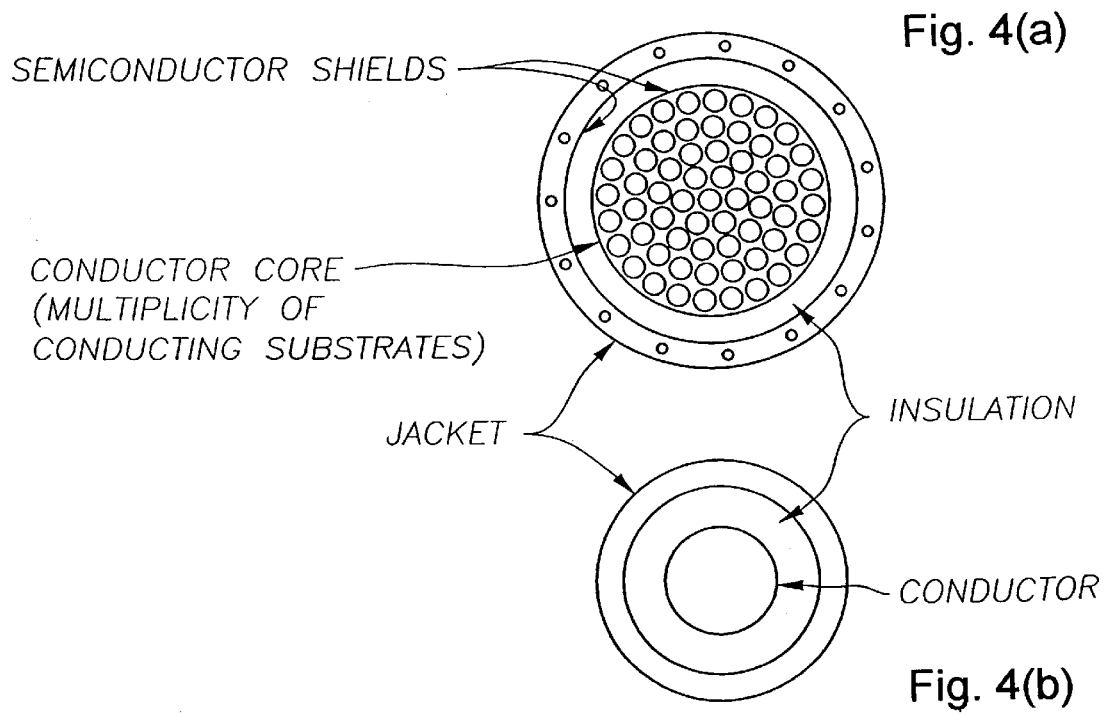
Fig. 4
Fig. 4(a)
Fig. 4(b)

ELECTRICAL CABLES HAVING POLYMERIC COMPONENTS

CROSS-REFERENCES TO RELATED APPLICATIONS

This is a continuation of application Ser. No. 08/625,451, filed Mar. 29, 1996, now abandoned, which is a continuation of application Ser. No. 08/473,377, filed Jun. 7, 1995, now abandoned, which is a divisional of application Ser. No. 08/304,039 filed Sep. 9, 1994, now abandoned, which is a divisional of application Ser. No. 08/025,015, filed Mar. 2, 1993, now abandoned, which is a continuation-in-part of application Ser. No. 07/745,479, filed Aug. 15, 1991, now U.S. Pat. No. 5,246,783.

FIELD OF THE INVENTION

The invention relates to electric power cables having a polymeric component. More particularly, the cables have a polymeric conducting, protective or insulating component.

BACKGROUND OF THE INVENTION

Typical power cables generally have one or more conductors in a core that is surrounded by several layers that can include: a first polymeric semiconducting shield layer, a polymeric insulating layer, a second polymeric semiconducting shield layer, a metallic tape shield and a polymeric jacket.

Polymeric materials have been utilized in the past as electrical insulating and semiconducting shield materials for power cables. In services or products requiring long-term performance of an electrical cable, such polymeric materials, in addition to having suitable dielectric properties, must be durable. For example, polymeric insulation utilized in building wire, electrical motor or machinery power wires, or underground power transmitting cables, must be durable for safety and economic necessities and practicalities.

One major type of failure that polymeric power cable insulation can undergo is the phenomenon known as treeing. Treeing generally progresses through a dielectric section under electrical stress so that, if visible, its path looks something like a tree. Treeing may occur and progress slowly by periodic partial discharge. It may also occur slowly in the presence of moisture without any partial discharge, or it may occur rapidly as the result of an impulse voltage. Trees may form at the site of a high electrical stress such as contaminants or voids in the body of the insulation-semiconductive screen interface. In solid organic dielectrics, treeing is the most likely mechanism of electrical failures, which do not occur catastrophically, but rather appear to be the result of a more lengthy process. In the past, extending the service life of polymeric insulation has been achieved by modifying the polymeric materials by blending, grafting, or copolymerization of silane-based molecules or other additives so that either trees are initiated only at higher voltages than usual or grow more slowly once initiated.

There are two kinds of treeing known as electrical treeing and water treeing. Electrical treeing results from internal electrical discharges that decompose the dielectric. High voltage impulses can produce electrical trees. The damage which results from the application of moderate alternating current voltages to the electrode/insulation interfaces, which can contain imperfections, is commercially significant. In this case, very high, localized stress gradients can exist and with sufficient time can lead to initiation and growth of trees. An example of this is a high voltage power cable or connector with a rough interface between the conductor or conductor shield and the primary insulator. The failure mechanism involves actual breakdown of the modular structure of the dielectric material, perhaps by electron bombardment. In the past much of the art has been concerned with the inhibition of electrical trees.

In contrast to electrical treeing, which results from internal electrical discharges that decompose the dielectric, water treeing is the deterioration of a solid dielectric material, which is simultaneously exposed to liquid or vapor and an electric field. Buried power cables are especially vulnerable to electrical treeing. Water trees initiate from sites of high electrical stress such as rough interfaces, protruding conductive points, voids, or imbedded contaminants, but at a lower voltages than that required for electrical trees. In contrast to electrical trees, water trees have the following distinguishing characteristics; (a) the presence of water is essential for their growth; (b) no partial discharge is normally detected during their growth; (c) they can grow for years before reaching a size that may contribute to a breakdown; (d) although slow growing, they are initiated and grow in much lower electrical fields than those required for the development of electrical trees.

Electrical insulation applications are generally divided into low voltage insulation (less than 1 K volts), medium voltage insulation (ranging from 1 K volts to 35 K volts), and high voltage insulation (above 35 K volts). In low to medium voltage applications, for example, electrical cables and applications in the automotive industry, electrical treeing is generally not a pervasive problem and is far less common than water treeing, which frequently is a problem. For medium-voltage applications, the most common polymeric insulators are made from either polyethylene homopolymers or ethylene-propylene elastomers, otherwise known as ethylene-propylene-rubber (EPR).

Polyethylene is generally used neat (without a filler) as an electrical insulation material. Polyethylenes have very good dielectric properties, especially dielectric constants and power factors. The dielectric constant of polyethylene is in the range of about 2.2 to 2.3. The power factor, which is a function of electrical energy dissipated and lost should be as low as possible, is around 0.0002, a very desirable value. The mechanical properties of polyethylene are also adequate for utilization as medium-voltage insulation. However, polyethylene homopolymers are very prone to water treeing, especially toward the upper end of the medium-voltage range.

There have been attempts to make polyethylene-based polymers that would have long-term electrical stability. For example, when dicumyl peroxide is used as a crosslinking agent for polyethylene, the peroxide residue functions as a tree inhibitor for some time after curing. However, these residues are eventually lost at most temperatures where electrical power cable are used. U.S. Pat. No. 4,144,202 issued Mar. 13, 1979 to Ashcraft, et al. discloses the incorporation into polyethylenes of at least one epoxy containing organo-silane as a treeing inhibitor. However, a need still exists for a polymeric insulator having improved treeing resistance over such silane containing polyethylenes.

Unlike polyethylene, which can be utilized neat, the other common medium-voltage insulator, EPR, must contain a high level of filler in order to resist treeing. When utilized as a medium-voltage insulator, EPR will generally contain about 20 to about 50 weight percent filler, most likely, calcined clay, and preferably crosslinked with peroxides. The presence of the filler gives EPR a high resistance against the propagation of trees. EPR also has mechanical properties comparable to polyethylene.

Unfortunately, while the fillers utilized in EPR may help prevent treeing, they will generally have poor dielectric properties, i.e. poor dielectric constant and poor power factor. The dielectric constant of filled EPR is in the range of about 2.3 to about 2.8. Its power factor is on the order of about 0.002 to about 0.005, which is about an order of magnitude worse than polyethylene.

Thus, both polyethylenes and EPR have serious limitations. Polyethylene although has good electric properties and good mechanical properties, it has poor water tree resistance. While filled EPR has good treeing resistance, it has poor dielectric properties.

Another class of polymers exists today and are described in EP-A-0 341 644 published Nov. 15, 1989. This reference describes linear polyethylenes produced by a traditional Ziegler-Natta catalyst systems. They generally have a broad molecular weight distribution similar to linear low-density polyethylene and at low enough densities can show better tree retardancy. However, these linear-type polymers in the wire and cable industry have poor melt temperature characteristics and poor processibility. In order to achieve a good mix in an extruder, linear polymers must be processed at a temperature at which traditionally used peroxides prematurely crosslink the polymers, a phenomenon commonly referred to as scorch. If the processing temperature is held low enough to avoid scorch, incomplete melting occurs because of the higher melting species in linear polymers having a broad molecular weight distribution. This phenomenon results in poor mixing, surging extruder pressures, and other poor results.

Therefore, a need exists in the electrical cable industry for a cable having a polymeric component, such as a conductor, semiconductor, insulator or protective layer, or combination thereof, having improved mechanical and dielectric properties and improved water treeing resistance.

SUMMARY OF THE INVENTION

This invention relates to electrical cables having at least one polymeric component or layer that exhibits improved resistance to treeing and other improved physical and mechanical properties.

The invention is directed toward a power cable having at least one polymeric layer where the layer is made of a polymer. The polymer is made, in one embodiment, from ethylene polymerized with at least one comonomer which is selected from either $C_3$ to $C_{20}$ alpha-olefins or $C_3$ to $C_{20}$ polyenes or both. The polymer has a density in the range of about 0.86 g/cm$^3$ to about 0.96 g/cm$^3$, a melt index in the range of about 0.2 dg/min. to about 100 dg/min., a molecular weight distribution in the range of about 1.5 to about 30. The polymer also has a composition distribution breadth index greater than 45 percent. Another embodiment of this invention provides a transmission cable for carrying an electrical current containing the polymer described above. Yet another embodiment provides an electrical cable for use in low, medium and high-voltage power lines containing the polymer described above. Still another embodiment of the invention provides a coaxial cable having a conducting, protective or insulating layer made from the polymer described above. The polymers utilized in this invention, generally have a tree rating less than about 40, a power factor in the range of about 0.0002 to about 0.0005, and a dielectric constant in the range of about 1.8 to about 2.4.

BRIEF DESCRIPTION OF THE DRAWINGS

The following detailed description when read in conjunction with the accompanying drawings will clarify the foregoing aspects, features, and advantages of the invention, in which:

FIG. 3 is an illustration of a typical power cable, which shows a multiplicity of conducting substrates comprising the conductive core, which is substantially surrounded by several protective layers that are either jacket, insulator, or semiconductive-shields layers.

FIG. 4(a) and FIG. 4(b) are cross-sectional views of typical medium-voltage and low-voltage power lines respectively.

DETAILED DESCRIPTION OF THE INVENTION

Figure 1:
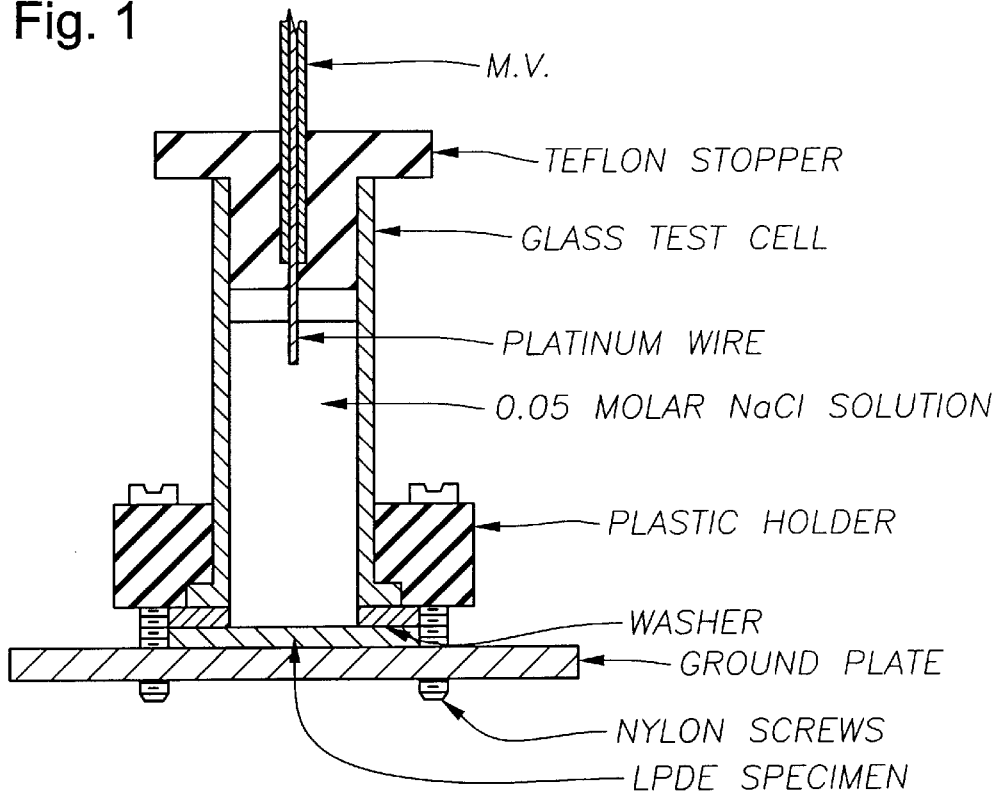
FIG. 1 is an illustration of the test apparatus utilized to determine the degree of treeing of the various samples that were tested.

The invention particularly relates to polymeric products utilizing polyolefins, which products have a unique combination of good mechanical properties, good dielectric properties, and good water treeing resistance, as well as lower melt temperature for processability with peroxide-containing compounds. The products are therefore extremely useful as electric power cables and the like.

A number of variables in polyolefins affect the properties of the polymer. Two of the most important are composition distribution (CD) and molecular weight distribution (MWD). Composition distribution refers to the distribution of comonomer between copolymer molecules and the distribution of comonomer within each polymer molecule. In this invention modification of the molecular architecture of the polymer occurs without the addition of molecules other than hydrocarbons. This feature relates directly to polymer crystallizability, optical properties, toughness, melt processability, and many other important end-use characteristics. MWD plays a significant role in the level and balance of physical properties achievable and is also a significant factor in melt processability. The polymers of this invention have a unique combination of MWD and CD. The MWD is very narrow and the CD is homogeneous between molecules and better than random within the molecules. This unique polyolefin polymer, with the physical-strength properties, electrical properties, tree retardancy, which can be seen from Table VIII, and melt temperature, is highly desirable for electrical applications, specifically, for use in wire and cable applications.

Also important is the molecular weight (MW) of the polymer, which determines the level of melt viscosity and the ultimately desired physical properties of the polymer. The type and amount of comonomer also effects the physical properties and crystallizability of the copolymer.

The polymers utilized in the jacketing (protective), insulating, conducting or semiconducting layers of the inventive cables of the invention may be made by any suitable process which allows for the proper control of the above-mentioned structural features (MW, MWD, CD, comonomer type and amount) to yield the desired polymer with the desired physical strength properties, electrical properties, tree retardancy, and melt temperature for processability. One suitable method involves the use of a class of highly active olefin catalysts known as metallocenes, which for the purposes of this application are generally defined to contain one or more cyclopentadienyl moiety.

Metallocenes are well known especially in the preparation of polyethylene and copolyethylene-alpha-olefins. These catalysts, particularly those based on group IV transition metals, zirconium, titanium and hafnium, show extremely high activity in ethylene polymerization. These transition metal metallocene compounds are generally represented by the formula $(Cp)_m MR_n R'_p$, wherein Cp is a substituted, unsubstituted, bridged, unbridged or some combination of the foregoing, cyclopentadienyl ring; M is a Group IV, V or VI transition metal; R and R' are independently selected from a halogen, hydrocarbyl group, or hydrocarboxyl groups having 1–20 carbon atoms; m=1–3, n=0–3, p=0–3, and the sum of m+n+p equals the oxidation state of M. Various forms of the catalyst system of the metallocene type may be used for polymerization to prepare the polymers used in this invention, including but not limited to those of the homogeneous, supported catalyst type, wherein the catalyst and cocatalyst are together supported or reacted together onto an inert support for polymerization by a gas phase process, high pressure process, or a slurry, solution polymerization process. The metallocene catalysts are also highly flexible in that, by manipulation of the catalyst composition and reaction conditions, they can be made to provide polyolefins with controllable molecular weights from as low as about 200 (useful in applications such as lube-oil additives) to about 1 million or higher, as for example in ultra-high molecular weight linear polyethylene. At the same time, the MWD of the polymers can be controlled from extremely narrow (as in a polydispersity, $M_w/M_n$, of about 2), to broad (as in a polydispersity of about 8).

Exemplary of the development of these metallocene catalysts for the polymerization of ethylene are U.S. Pat. No. 4,937,299 and EP-A-0 129 368 to Ewen, et al., U.S. Pat. No. 4,808,561 to Welborn, Jr., and U.S. Pat. No. 4,814,310 to Chang, all hereby are fully incorporated by reference. Among other things, Ewen, et al. teaches that the structure of the metallocene catalyst includes an alumoxane, formed when water reacts with trialkyl aluminum. The alumoxane complexes with the metallocene compound to form the catalyst. Welborn, Jr. teaches a method of polymerization of ethylene with alpha-olefins and/or diolefins. Chang teaches a method of making a metallocene alumoxane catalyst system utilizing the absorbed water in a silica gel catalyst support. Specific methods for making ethylene/alpha-olefin copolymers, and ethylene/alpha-olefin/diene terpolymers are taught in U.S. Pat. Nos. 4,871,705 (issued Oct. 3, 1989) and 5,001,205 (issued Mar. 19, 1991) to Hoel, et al., and in EP-A-0 347 129 published Apr. 8, 1992, respectively, all of which are hereby fully incorporated by reference.

Other cocatalysts may be used with metallocenes, such as trialkylaluminum compounds or ionizing ionic activators, such as tri(n-butyl)ammonium tetra(pentafluorophenyl) boron, which ionize the neutral metallocene compound. Such ionizing compounds may contain an active proton or some other cation such as carbonium, which ionizing the metallocene on contact, forms a metallocene cation associated with (but not coordinated or only loosely coordinated with) the remaining ion of the ionizing ionic compound. Such compounds are described in EP-A-0 277 003 and EP-A-0 277 004, both published Aug. 3, 1988, and are herein fully incorporated by reference. Also, the polymers useful in this invention can be a metallocene catalyst component that is a monocylopentadienyl compound, which is activated by either an alumoxane or an ionic activator to form an active polymerization catalyst system. Catalyst systems of this type are shown by PCT International Publication WO92/00333, published Jan. 9, 1992, U.S. Pat. Nos. 5,096,867 and 5,055,438, EP-A-0 420 436 and WO91/04257 all of which are fully incorporated herein by reference. The catalyst systems described above may be optionally prepolymerized or used in conjunction with an additive component to enhance catalytic productivity.

As previously stated metallocene catalysts are particularly attractive in making tailored ultra-uniform and super-random specialty copolymers. For example, if a lower density copolymer is being made with a metallocene catalyst such as very low density polyethylene, (VLDPE), an ultra-uniform and super random copolymerization will occur, as contrasted to the polymer produced by copolymerization using a conventional Ziegler-Natta catalyst. In view of the ongoing need for electrical cables having improved mechanical and dielectric properties and improved water treeing resistance, as well as the need to process these materials at temperatures low enough to allow scorch free processing, it would be desirable to provide products utilizing the high quality characteristics of polyolefins prepared with metallocene catalysts.

The polymer utilized in the jacketing (protective), insulating or conducting layers of the electrical cables of the invention is selected from the group of polymers consisting of ethylene polymerized with at least one comonomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene. Preferably, the polymers utilized in the cables of the invention are either ethylene/alpha-olefin copolymers or ethylene/alpha-olefin/diene terpolymers. The polyene utilized in the invention generally has about 3 to about 20 carbon atoms. Preferably, the polyene has in the range of about 4 to about 20 carbon atoms, most preferably in the range of about 4 to about 15 carbon atoms. Preferably, the polyene is a diene, which can be a straight chain, branched chain, or cyclic hydrocarbon diene. Most preferably, the diene is a non conjugated diene.

The polymers suitable in the invention with desired monomer levels can be prepared by polymerization of suitable monomers in the presence of a supported or an unsupported catalyst utilizing the metallocene catalyst systems described above. The precise monomer content of the polymers utilized in the invention will depend upon economics and the desired applications of the resultant cable. Typically the polymers utilized in the invention will generally comprise in the range of about 68 mole percent to about 99 mole percent ethylene (based on the total moles of monomer). Preferably, the polymers have a minimum of 73 mole percent, most preferably 75 mole percent, ethylene. Preferably, the polymers have a maximum of 98, most preferably 94 mole percent, ethylene. One embodiment of the polymers utilized in the jacketing (protective), insulating, or conducting layers of the invention, will generally include in the range of about 73 mole percent to about 98 mole percent ethylene, and most preferably between about 75 mole percent to about 94 mole percent. The other monomers will comprise the balance of the polymer.

The polymers utilized in the polymeric layers of the invention have a density in the range of about 0.860 g/cm$^3$ to about 0.960 g/cm$^3$. Preferably, the polymers have a minimum density of about 0.865 g/cm$^3$, most preferably about 0.870 g/cm$^3$. Preferably, the polymers have a maximum density of about 0.93 g/cm$^3$, most preferably about 0.91 g/cm$^3$. Preferably the density is in the range of about 0.865 g/cm$^3$ to about 0.93 g/cm$^3$. Most preferably, the density is in the range of about 0.870 g/cm$^3$ to about 0.910 g/cm$^3$. Densities were measured using standard accepted procedures, except that they were additionally conditioned by holding them for 48 hours at ambient temperature (23° C.), prior to density measurement.

The melt index (MI) of the polymers utilized in the invention is such that the polymer can be extruded into the desired end product. Generally the melt index is in the range of about 0.2 dg/min. to about 100 dg/min. Preferably, the MI is at least about 1 dg/min., most preferably at least about 3 dg/min. Preferably, the maximum MI is about 50 dg/min., most preferably about 30 dg/min. Preferably the MI is in the range of about 1 dg/min. to about 50 dg/min., and most preferably in the range of about 3 dg/min. to about 30 dg/min. MI as measured herein was determined according to ASTM D-1238 (190/2.16). High load MI was determined according to ASTM D-1238 (190/21.6).

The polymer utilized in the power cables of the invention have a MWD such that the polymer will have the desired electrical properties and still be processable into the desired end product. The ratio of $M_w/M_n$ is generally in the range of about 1.5 to about 30. The maximum ratio is preferably about 10 and most preferably about 3.5. The minimum ratio is about 1.5, most preferably about 1.8. Preferably the ratio is in the range of about 1.7 to about 10, and most preferably in the range of about 1.8 to about 3.5.

The composition distribution breadth index (CDBI) of the polymers utilized in the polymeric layers of the invention is generally greater than about 45 percent. Preferably, the CDBI is greater than about 60 percent. Most preferably, the CDBI is greater than about 70 percent, and even more preferably, greater than about 80 percent and most preferably greater than about 90 percent. The CDBI is generally in the range of about 45 to about 90 percent, more preferably, in the range of about 50 to about 90 percent, and most preferably in the range of about 60 to 90 percent. As used herein, the CDBI is defined as the weight percent of the copolymer molecules having a comonomer content within 50 percent (i.e. ±50%) of the median total molar comonomer content. The CDBI of linear polyethylene, which does not contain a comonomer, is defined to be 100%.

A CDBI determination distinguishes, for example, the plastomers utilized in this invention (narrow CD, as assessed by CDBI values of about 45% or higher) from those traditionally utilized have CDBI values less than 45%. The CDBI of a copolymer is readily calculated from data obtained from techniques known in the art, such as, for example, Temperature Rising Elution Fractionation (TREF), as described, for example, in U.S. Pat. No. 5,008,204, or in Wild, et al., *J. Poly. Sci, Poly. Phys. Ed.*, vol. 20, p. 441 (1982), both of which are hereby fully incorporated by reference.

Solubility Distribution (SD) can be measured using a column of length 164 cm and 1.8 cm inner diameter packed with non-porous glass beads (20–30 mesh) and immersed in a temperature-programmable oil bath. The bath is stirred very vigorously to minimize temperature gradients within it, and the bath temperature is measured with a platinum resistance thermometer. About 1.6 g of polymer is placed in a sample preparation chamber and repeatedly evacuated and filled with nitrogen to remove oxygen from the system. A metered volume of tetrachlorethylene solvent is then pumped into the sample-preparation chamber, where it is stirred and heated under 3 atmospheres pressure at 140° C. to obtain a polymer solution of about 1 percent concentration. A metered volume of this solution, 100 cc, is then pumped into the packed column thermostated at a high temperature, 120° C.

In accordance with U.S. Pat. No. 5,008,204, the polymer solution in the column is subsequently crystallized by cooling the column to 0° C. at a cooling rate of approximately 20° C./min. The column temperature is then maintained at 0° C. for 25 minutes. The elution stage is then begun by pumping pure solvent, preheated to the temperature of the oil bath, through the column at a flow rate of 27 cc/min. Effluent from the column passes through a heated line to an IR detector, which is used to measure the absorbance of the effluent stream. The absorbance of the polymer carbon-hydrogen stretching bands at about 2960 cm$^{-1}$ serves as a continuous measure of the relative-weight-percent concentration of polymer in the effluent. After passing through the infrared detector, the temperature of the effluent is reduced to about 110° C., and the pressure is reduced to atmospheric pressure before passing the effluent stream into an automatic fraction collector. Fractions are collected in 3° C. intervals. In the elution stage pure tetrachlorethylene solvent is first pumped through the column at 0° C. at 27 cc/min. for 25 minutes. This step flushes polymer that has not crystallized during the cooling stage out of the column so that the percent of uncrystallized polymer (i.e. the percent of polymer soluble at 0° C.) can be determined from the infrared trace. The temperature is then programmed upward at a rate of 1.0° C./min. to 120° C. A solubility distribution curve, i.e. a plot of weight fraction of polymer solubilized as a function of temperature, is thus obtained.

The CD of a crystalline interpolymer can be determined as follows. The composition and number average molecular weight, $M_n$, of fractions collected in various narrow temperature intervals for several poly(ethylene-co-butenes) was determined by C13 NMR and size-exclusion chromatography, respectively. A plot is made of mole percent comonomer versus elution temperature. For the purposes of simplifying the correlation of composition with elution temperature the number average molecular weight fractions less than about 15,000 are ignored. These low $M_n$ fractions generally make up an inconsequential portion of the polymer in this invention. Thus, the temperature scale of a solubility distribution plot described above can be simply transformed to a composition scale, yielding a weight fraction of polymer versus composition curve. A quantitative measure of the breadth of the composition distribution is provided by the CDBI. CDBI as previously defined is the percent of polymer whose composition is within 50% of the median comonomer composition. It is calculated from the composition distribution curve and the normalized cumulative integral of the composition distribution curve.

Unless otherwise indicated, terms such as "comonomer content", "average comonomer content" and the like refer to the bulk comonomer content of the indicated interpolymer blend, blend component or fraction on a molar basis.

Using the polymer described above, a power cable having a jacketing (protective), insulating or conducting layer can be made that will have improved resistance to treeing and other improved electrical properties, for example, a good dielectric constant and power factor.

The tree rating as described in the invention is determined according to the method of Densley, et al., *Water Treeing*

Figure 2:
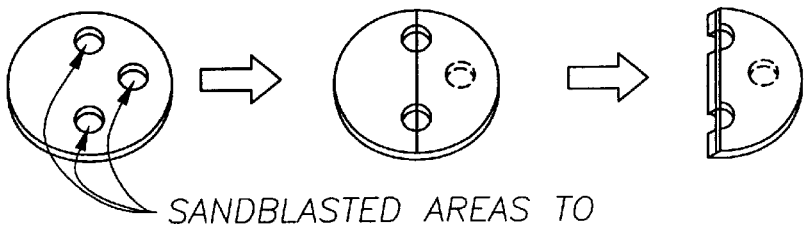
FIG. 2 is a representation of the method for analyzing the test samples once they have been aged in the test apparatus of FIG. 1.
Figure 2:
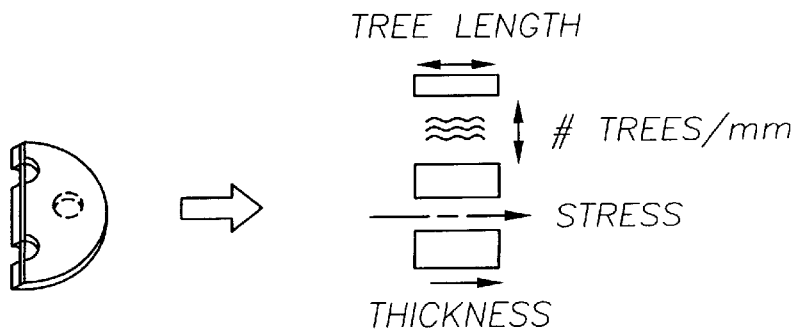

Studies in Cable Insulation, Proceedings of the Twenty Second Symposium on Electrical Insulating Materials (Tokyo, Japan, 1989) and Bulinski, et al., *Water Treeing in a Heavily Oxidized Cross-linked Polyethylene Insulation*, Sixth International Symposium On High Voltage Engineering, New Orleans (Aug. 28–Sep. 1, 1989), both herein incorporated by reference. The general method is as follows. A 75 ml plaque of the material to be tested is pressed at 175° C. and then cut into 1 inch diameter circles. Three small areas are sandblasted onto the surface of the circles to accelerate tree initiation. The samples were stressed for 3,500 hours at 6 kV, 1000 HZ at 75° C., in contact with 0.1 M NaCl solution, using an apparatus as shown in FIG. 1. The degree of treeing was determined by slicing the sample vertically through two of the sandblasted areas and then measuring the length of the trees relative to the thickness of the sample (Length/Thickness×100=tree rating) (stress is inversely proportional to the sample thickness). FIG. 2 is a representation of the method for analyzing the tree retardancy test samples.

The polymer utilized in the jacketing (protective), insulating or conducting (or semiconducting) layer has a good tree rating superior to that of neat polyethylenes, and to filled EPR's. The tree rating is generally less than about 40, preferably less than about 25, and most preferably less than about 15, and still even more preferably less than about 10.

Not only do the polymers utilized in the invention have good resistance to treeing, they also posses good dielectric properties, favorable to neat polyethylenes. Generally the dielectric constant of the polymers utilized in the invention is in the range of about 1.8 to about 2.4. Another good dielectric property of the polymer utilized in this invention is a good power factor. The power factor of the polymer is generally in the range of about 0.0002 to about 0.0005.

The polymers utilized in the invention may be crosslinked chemically or with radiation. A suitable crosslinking agent is dicumyl peroxide.

The insulating layer of one embodiment of the cables of the invention may contain a neat polymer, or it may optionally be filled. An illustrative example of a suitable filler is kaolin clay. The conducting or semiconducting layer of the invention must be filled with a conducting filler to render the layer semiconducting. The most common filler for semiconducting applications is carbon black, which generally comprises 30 to 40 weight percent of the filled semiconducting layer.

Other additives commonly employed in the polyolefin compositions utilized in the invention can include, for example, crosslinking agents, antioxidants, processing aids, pigments, dyes, colorants, metal deactivators, oil extenders, stabilizers, and lubricants.

The cable of the invention may take on any form that is suitable for the use to which it will serve. The components of the cable of the invention, i.e. the insulating, jacketing (protective), conducting, semiconducting, or insulating layer, can be arranged relative to each other in a wide variety of ways, depending upon the desired use of the cable. Generally, the insulating layer is arranged so that it will function as an insulator of the conducting or semiconducting layer. For example, the various components may be: affixed together, in proximity to each other, in contact with each other, adjacent to each other, or one may substantially surround another. Generally in the power cable field, the a cable will comprise a conducting core of one or more electrically conducting substrates that is substantially surrounded by one or more layers of insulators and/or semiconductor shields. FIG. 3 is an illustration of a typical power cable, which shows a multiplicity of conducting substrates comprising the conductive core that is substantially surrounded by several layers that are either jacket, protective, insulator layers or semiconductive shields. FIG. 4(*a*) is a cross-sectional view of a typical medium voltage power cable, showing a conductor core comprising a multiplicity of conducting substrates, a first semiconducting shield layer, an insulation layer, a second semiconducting shield layer, and a jacket layer. FIG. 4(*b*) is a cross-sectional view of a typical low voltage power cable showing a conductor substantially surrounded by insulation and jacket layers. While this invention is of greatest advantage in low and medium voltage applications where water treeing is most common, it is also useful in high voltage applications.

Traditionally, the jacketing materials normally employed in power cables include neoprene over EPR insulated cables, and polyvinyl chloride (PVC) over polyethylene insulated cables. According to this invention, not only is the polymer of the invention suitable for the insulating and shielding layers, it may also be utilized in jacket layers.

All of the components of the compositions utilized in the invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for fabricating polymer insulated cable and wire are well known, and fabrication of the cable of the invention may generally be accomplished any of the various extrusion methods.

In a typical extrusion method, an optionally heated conducting core to be coated is pulled through a heated extrusion die, generally a cross-head die, in which a layer of melted polymer is applied to the conducting core. Upon exiting the die, the conducting core with the applied polymer layer is passed through a cooling section, generally an elongated cooling bath, to harden. Multiple polymer layers may be applied by consecutive extrusion steps in which an additional layer is added in each step, or with the proper type of die, multiple polymer layers may be applied simultaneously.

The conductor of the invention may generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

EXAMPLES

In order to provide a better understanding of the invention including representative advantages thereof, the following examples are offered as related to actual tests performed in the practice of this invention, and illustrate the surprising and unexpected properties of the cables of this invention and are not intended as a limitation on the scope of the invention. The ethylene/alpha-olefin copolymers suitable for use in the invention may be prepared as shown in Example I. The diolefin containing terpolymer utilized in the invention may be prepared as shown in Examples II and III.

Example I

Preparation of Ethylene/alpha-olefin Copolymers

A catalyst is prepared by adding 5.1 liters of a 10% solution of trimethylaluminum in heptane into a dry and oxygen-free two-gallon reactor equipped with a mechanical stirrer. A 800 g sample of undehydrated silica gel, containing 12.3% water, is then added into the reactor. After the addition is complete, the mixture is stirred at ambient temperature for one hour. A 20 g sample of di-(n-butylcyclopentadienyl) zirconium dichloride slurried in 30 l (liters) of heptane is then added into the reactor and the mixture is allowed to react at ambient temperature for 30 minutes. The reactor is then heated to 65° C., while a nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, butene-1 and nitrogen were fed continuously into the reactor to maintain a constant production rate. Product was periodically removed from the reactor to maintain the desired bed weight. The polymerization conditions are shown in Table I below.

TABLE I

| Gas Phase Polymerization | | | |
|---|---|---|---|
| | A | B | C |
| Temperature (° F.) | 121 | 110 | 145 |
| Total Pressure (psia) | 300 | 300 | 300 |
| Gas Velocity (ft/sec) | 1.55 | 1.85 | 1.70 |
| Catalyst Feed Rate (g/hr) | 3.0 | 3.5 | 8.9 |
| Butene-1 Feed Rate (lb/hr) | 5.8 | 6.0 | 5.8 |
| Production Rate (lb/hr) | 33 | 33 | 28 |

The polymerized products "A", "B" and "C" are useful for use in the invention and had characterizing properties as shown in Table II below:

TABLE II

| Characterization Data | | | |
|---|---|---|---|
| | A | B | C |
| Melt Index (dg/min) | 3.3 | 9.5 | 9.0 |
| Density (g/cm$^3$) | 0.882 | 0.88 | 0.895 |
| $M_n$ | 41380 | 27910 | 31450 |
| $M_w$ | 78030 | 58590 | 62670 |
| $M_w/M_n$ | 1.89 | 2.10 | 1.99 |

Note: $M_n$ is number average molecular weight. $M_w$ weight average molecular weight. Both determined via the technique of Gel Permeation Chromatography, a well accepted procedure.

It will be recognized by persons skilled in the art, that products with different Melt Indices and Densities to A, B, and C above can be obtained by changing the process conditions. Additionally, the composition of the products can be altered, depending on the choice of alpha-olefin comonomer used.

Example II

Preparation of Diolefin-Containing Copolymers

A catalyst is prepared by adding 2.7 liters of a 10% solution of methylalumoxane (MAO) in toluene into a dry and oxygen-free two-gallon reactor equipped with a mechanical stirrer. A 800 g sample of silica gel, dried at 800° C. is slowly added into the reactor. After the addition is complete, the mixture is stirred at 65° C. for one hour. A 20 g sample of bis-indenyl zirconium dichloride dissolved in 30 of toluene is then added into the reactor and the mixture is allowed to react at 65° C. for 30 minutes. Nitrogen gas is then purged through the reactor to remove the solvent. The nitrogen purging is stopped when the mixture in the reactor turns into a free-flowing powder.

The polymerization was conducted in a 16-inch diameter fluidized gas phase reactor. Ethylene, 1–4 hexadiene, butene-1 and nitrogen were fed continuously into the reactor to maintain a constant production rate. Product was periodically removed from the reactor to maintain the desired bed weight. The polymerization conditions are shown in Table III below.

TABLE III

| Gas Phase Polymerization | | |
|---|---|---|
| | D | E |
| Temperature (° F.) | 136 | 136 |
| Total Pressure (psia) | 300 | 300 |
| Gas Velocity (ft/sec) | 1.86 | 1.85 |
| Catalyst Feed Rate (g/hr) | 15 | 15 |
| Butene-1 Feed Rate (lb/hr) | 5.5 | 4.8 |
| 1–4 Hexadiene Feed Rate (lb/hr) | 0.7 | 0.5 |
| Production Rate (lb/hr) | 19 | 15 |

Polymerized product D had a Melt Index of 6, a density of 0.893 g/cm$^3$ and a 2.1 mole % level of incorporated 1–4 hexadiene. Polymerized product E had a Melt Index of 5.5, a density of 0.897 g/cm$^3$ and a 1.3 mole % level of incorporated 1,4 hexadiene.

It will be recognized by persons skilled in the art that products with different Melt Indices, Densities and levels of incorporated 1,4 hexadiene to D and E above, can be obtained by changing the process conditions. Additionally, the composition of the products can be altered, depending on the choice of alpha olefin comonomer used.

Example III

Preparation of Diolefin-Containing Copolymer

A catalyst is prepared by adding 5.1 liters of a 10% solution of trimethylaluminum in heptane into a dry and oxygen-free two-gallon reactor equipped with a mechanical stirrer. A 800 g sample of undehydrated silica gel, containing 12.3% water, is slowly added into the reactor. After the addition is complete, the mixture is stirred at ambient temperature for one hour. A 20 g sample of bis-indenyl zirconium dichloride slurried in 30 liters of heptane is then added into the reactor and the mixture is allowed to react at ambient temperature for 30 minutes. The reactor is then heated to 65° C., while the nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, 1–4 hexadiene, butene-1 and nitrogen were fed continuously into the reactor to maintain a constant production rate. Product was periodically removed from the reactor to maintain the desired bed weight. The polymerization conditions are shown in Table IV below.

TABLE IV

Gas Phase Polymerization

| | F |
|---|---|
| Temperature (° F.) | 117 |
| Total Pressure (psia) | 300 |
| Gas Velocity (ft/sec) | 1.81 |
| Catalyst Feed Rate (g/hr) | 14.5 |
| Butene-1 Feed Rate (lb/hr) | 3.4 |
| 104 Hexadiene Feed Rate (lb/hr) | 0.65 |
| Production Rage (lb/hr) | 11 |

Polymerized product F had a Melt Index of 2.5 and a density of 0.887 g/cm$^3$ and a 2.0 mole % level of incorporated 1–4 hexadiene. As mentioned previously, products with different melt indices, densities and levels of 1–4 hexadiene can be obtained by changing the process conditions. Additionally, the composition of the products can be altered depending on the choice of alpha olefin comonomers used.

Example IV

In this Example, Polymer C, a polymer described as being useful in the invention is compared against 2 commercial LDPE homopolymers [Exxon's LD-400 and LD-411] that are representative of the polyethylene used to make XLPE power cable insulation. All polymers were tested unfilled and crosslinked (via dicumyl peroxide).

It is well known to those of skill in the art that unfilled LDPE has outstanding dielectric properties, superior to those of EP elastomers (i.e. EPR or EPDM) whether neat or filled. The data in TABLE V shows the dielectric performance of POLYMER C to that displayed by LDPE.

TABLE V

Dielectric Properties (Unfilled Polymers)

| | POLYMER C | LDPE Homopolymer (2.3 MI,0.921 D) | LDPE Homopolymer (2.3 MI,0.921 D) |
|---|---|---|---|
| DICUP R | 2.6 | 2.6 | 2.6 |
| ELECTRICAL PROPERTIES | | | |
| DIELECTRIC CONSTANT | | | |
| + ORIGINAL | 2.30 | 2.37 | 2.37 |
| + 1 DAY/90 C WATER | 2.00 | 2.16 | 2.16 |
| + 7 DAYS/90 C WATER | 1.92 | 2.15 | 2.14 |
| + 14 DAYS/90 C WATER | 1.92 | 2.14 | 2.12 |
| + ORIGINAL POWER FACTOR | 0.00053 | 0.00057 | 0.00056 |
| + 1 DAY/90 C WATER | 0.00060 | 0.00054 | 0.00055 |
| + 7 DAYS/90 C WATER | 0.00063 | 0.00056 | 0.00062 |
| + 14 DAYS/90 C WATER | 0.00069 | 0.00056 | 0.00064 |

Example V

In this Example, dielectric properties were remeasured for four Superohm 3728 type formulations (at 0, 30, 60 and 100 parts filler as shown in TABLE VI). The data in TABLE VII shows the gradual deterioration in the dielectric performance with increasing filler loading. Commercially available filled compounds based on EP elastomers vary in filler loading from about 30 parts (20 wt %) to about 110 parts (47 wt %), depending on requirements for product extrusion, dielectric performance, tree retardance performance, physical properties, as well as other requirements. The polymers utilized in this invention that display inherently good tree retardance allow compound formulation with less filler, thereby allowing a more favorable balance of dielectric, tree retardant and physical properties to be achieved.

TABLE VI

Filled Insulation Formulations

| POLYMER: | Ethylene/Butene-1 Copolymer |
| | 2.0 Melt Index |
| | 0.8971 G/CM$^3$ Density |
| | Similar to Polymer C, but lower Melt Index |
| FORMULATIONS: | SUPEROHM 3728 Type Formulation, |
| | But at 0, 30, 60 and 100 Parts |
| | Filler (TRANSLINK - 37, i.e. calcined clay) |
| | per 100 parts of Polymer |

NOTE:
SUPEROHM 3728 is a well regarded filled EP-based electrical insulation compound.
TRANSLINK-37 is a calcined clay and is a widely used filler used in filled electrical insulation compounds.

TABLE VII

Dielectric Properties of Filled Insulation Formulations

| | (0 Parts Filler) | (30 Parts Filler) | (60 Parts Filler) | (100 Parts Filler) |
|---|---|---|---|---|
| ORIGINAL | | | | |
| Dielectric Constant | 2.281 | 2.488 | 2.631 | 2.836 |
| Power Factor | 0.00130 | 0.00245 | 0.00300 | 0.00399 |
| Vol. Resist | 38 | 4.9 | 4.7 | 3.0 |
| ($10^{15}$OHM-CM) | | | | |
| AGED 24 H WATER 90 C | | | | |
| Dielectric Constant | 2.225 | 2.436 | 2.543 | 2.776 |

TABLE VII-continued

Dielectric Properties of Filled Insulation Formulations

| | (0 Parts Filler) | (30 Parts Filler) | (60 Parts Filler) | (100 Parts Filler) |
|---|---|---|---|---|
| Power Factor | 0.00170 | 0.00221 | 0.00262 | 0.00323 |
| Vol. Rest.($10^{15}$ OHM-CM) | 13 | 3.2 | 7.5 | 1.8 |

Example VI

In this Example, polymers useful as insulating and semi-conducting materials, are compared against commercially available polymers.

The data show polymers of this invention provide a favorable balance of dielectric properties, tree rating, and physical properties vis-a-vis, unfilled crosslinked polyethylene (0.920 density, 2.8 MI, homopolymer and filled EPR.

TABLE VIII

Evaluation of Insulation Formulations

|  | 1 Unfilled Cross-linked LDPE | 2* Filled Cross-linked EP I | 3** Filled Cross-linked EP II | 4* Filled Cross-linked Polymer A | 5 Unfilled Cross-linked Polymer F | 6* Filled Cross-linked Polymer D |
|---|---|---|---|---|---|---|
| DIELECTRIC PROPERTIES | | | | | | |
| Dielectric Strength (V/MIL) | 775 | 750 | 725 | 700 | 775 | 720 |
| Dielectric Constant | | | | | | |
| Original | 2.37 | 2.76 | 2.85 | 2.71 | 2.32 | 2.70 |
| Aged 24 Hr/90° C. Water | 1.16 | 2.51 | 2.7 | 2.44 | 2.05 | 2.50 |
| Power Factor | | | | | | |
| Original | 0.00030 | 0.0021 | 0.004 | 0.0024 | 0.00026 | 0.0025 |
| Aged 24 Hr/90° C. Water | 0.00034 | 0.0064 | 0.008 | 0.0063 | 0.00026 | 0.0065 |
| TREEING PERFORMANCE | | | | | | |
| Tree Retardance Rating (100 × L/T) | 68 | 1–5 | 15–20 | 15–35 | 5–10 | 5–10 |
| PHYSICAL PROPERTIES | | | | | | |
| Tensile Strength (PSI) | | | | | | |
| Original | 2300 | 1710 | 1300 | 2555 | 2475 | 2700 |
| Aged 7 days (C) | 136 | 150 | 150 | 150 | 150 | 150 |
| % Retained on Aging | 95 | 100 | 100 | 100 | 98 | 98 |
| Elongation (%) | | | | | | |
| Original | 525 | 320 | 300 | 405 | 540 | 370 |
| Aged 7 days (C) | 136 | 150 | 150 | 150 | 150 | 150 |
| % Retained on Aging | 95 | 94 | 90 | 92 | 98 | 90 |

*Typical Superohm type formulation.
**Alternative commercial EP formulation with a minimal stabilization package.

Example VII

In this Example, polymers suitable for use in the invention are compared against various commercially available polymers for tree retardancy. As was explained above, the tree rating as utilized in the invention is determined according to the method of Bulinski, et al., *Water Treeing in a Heavily Oxidized Cross-linked Polyethylene Insulation*, Sixth International Symposium On High Voltage Engineering, New Orleans (Aug. 28–Sep. 1, 1989). The general method is as follows. A 75 ml plaque of the material to be tested is pressed at 175° C. and then cut into 1 inch diameter circles. Three small areas are sandblasted onto the surface of the circles to accelerate tree initiation. The samples were stressed for 3,500 hours at 6 kV, 1000 HZ at 75° C., in contact with 0.1N NaCl solution, using an apparatus as shown in FIG. 1. The degree of treeing was determined by slicing the sample vertically through two of the sandblasted areas and then measuring the length of the trees relative to the thickness of the sample (stress is proportional to the thickness). FIG. 2 is a representation of the method for analyzing the tree retardancy test samples. Tree rating data is presented in TABLE IX below.

In TABLE IX, the polymers suitable to be utilized in this invention are referred to by the tradename EXACT, or by the polymer designation from Examples 1–3. The commercially available EXACT polymers are referred by product number. Those EXACT polymers not having a product number, are pilot plant samples.

TABLE IX

NRC TREE RETARDANCY DATA
(Sorted by Length/Thickness (x100))

Sample*L/T (x100)

| | | |
|---|---|---|
| 32 | LDPE (50)/Semicrystalline EP (50)/Translink37 (25) | 0 |
| 21 | Commercial Filled MV Insulation Compound | 0 |
| 22 | Commercial Filled MV Insulation Compound | 0 |
| 14 | Amorphous EP | 7 |
| 17 | POLYMER F | 8 |
| 33 | LDPE (50)/Semicrystalline EP (50)/Translink37 (50) | 9 |
| 10 | Commercial XLPE | 9 |
| 15 | Amorphous EP (100)/Translink 37 (30) | 11 |
| 9 | POLYMER C | 16 |
| 4 | MDV 87-31 (in commercial MV EP insulation formulation) | 16 |
| 19 | Commercial tree retardant XLPE | 16 |
| 16 | Amorphous EP (100)/Translink 37 (60) | 16 |
| 5 | Semi-crystalline EP copolymer/Flexon/Translink 37 (101) | 16 |
| 31 | LD180 50/Semicrystalline EP (50) | 19 |

TABLE IX-continued

NRC TREE RETARDANCY DATA
(Sorted by Length/Thickness (x100))

| Sample | * | L/T (x100) |
|---|---|---|
| 1 | EMS 4003 (SLP D = 0.895, MI = 9, $C_2=/C_4=$) | 20 |
| 11 | Commercial LLDPE | 20 |
| 6 | Commercial tree retardant XLPE | 22 |
| 13 | Amorphous EP | 25 |
| 12 | EXACT (D = 0.939, MI = 7, $C_2=/C_4=$) | 33 |
| 7 | POLYMER C | 33 |
| 8 | POLYMER A | 36 |
| 23 | EXACT (_ = 0.884, MI = 1.7, $C_2=/C_3=$) | 39 |
| 3 | Commercial LDPE | 46 |
| 30 | LDPE (60)/Semicrystalline EP (40) | 46 |
| 25 | EXACT (D = 0.885, MI = 4, $C_2=/C_6=$) | 58 |
| 18 | Commercial XLPE | 68 |
| 27 | LDPE (90)/Semicrystalline EP (10) | 69 |
| 28 | LD180 80/Semicrystalline EP (20) | 70 |
| 24 | EXP314 (D = 0.886, MI = 5, $C_2=/C_4=$) | 70 |
| 2 | POLYMER C | 70 |
| 26 | Commercial LDPE | 98 |
| 29 | LDPE (70)/Semicrystalline EP (30) | 98 |

*All samples were crosslinked with Dicup R and contain a minimal stabilization package.

Example VIII

In this Example, the crosslinkability of the polymers utilized in the invention are compared to commercially available polymers. The polymers were crosslinked with both dicumyl peroxide and with radiation.

Figure 5:
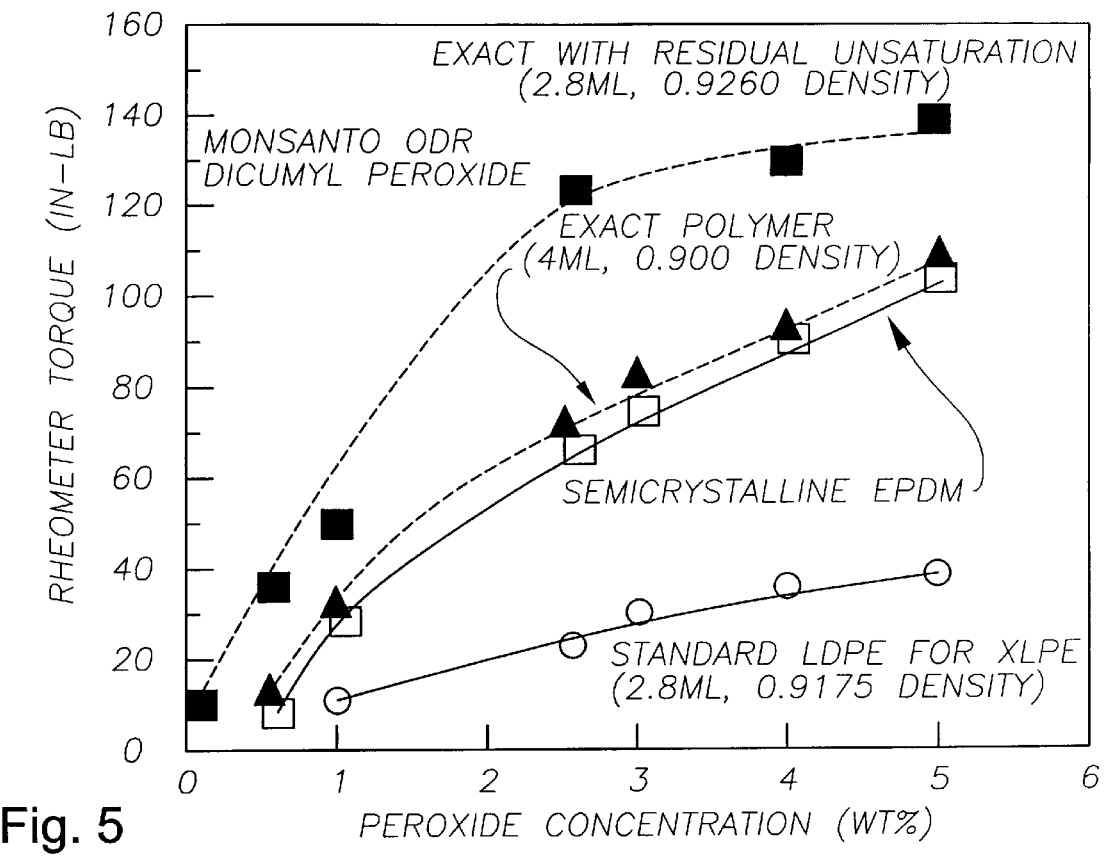
FIG. 5 is a graph of the peroxide response for various polymers.

The peroxide response of the polymers of the invention (including diolefin-containing polymers which provide residual olefinic unsaturation) compared to semicrystalline EPDM and a standard LDPE are shown in FIG. 5. In FIG. 5 the polymers useful in this invention are designated by the tradename "EXACT". This figure shows that in an environment of equivalent peroxide levels, the polymers utilized in the invention will have a greater response, as evidenced by greater torque values.

Figure 6:
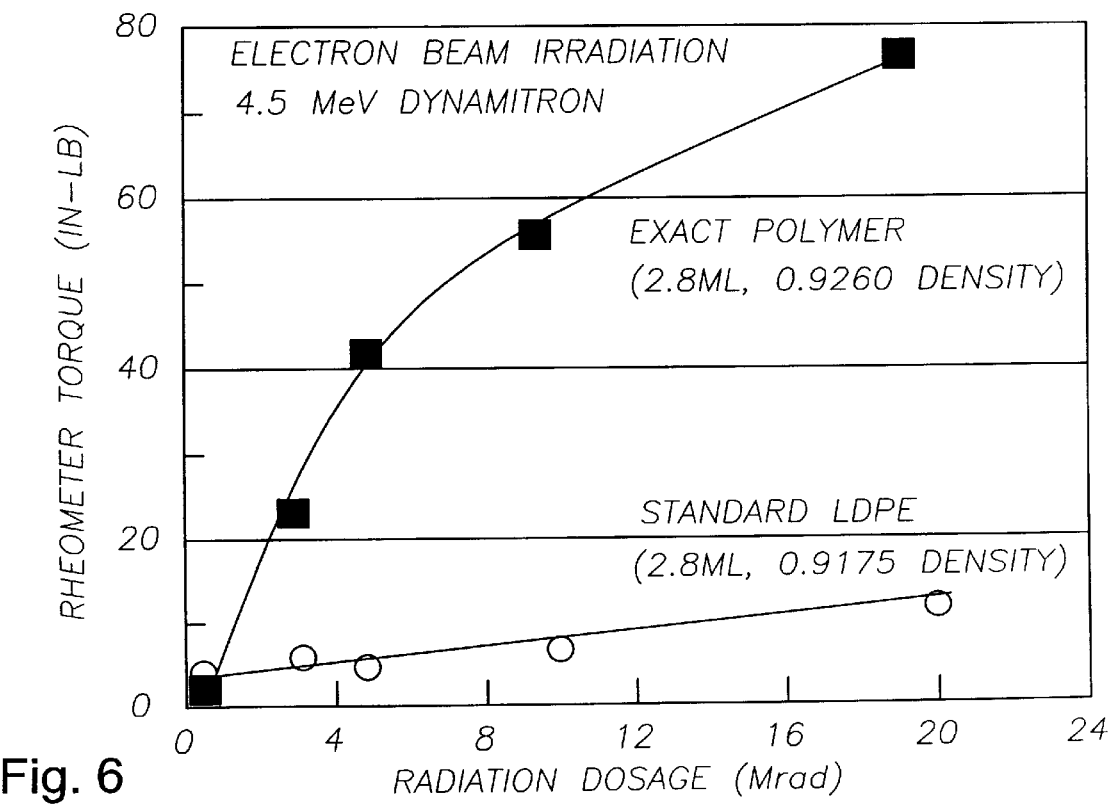
FIG. 6 is a graph of the radiation response for various polymers.

The radiation response of the polymers of the invention compared to LDPE is shown in FIG. 6. In FIG. 6, the polymer useful in the invention is designated by the tradename "EXACT". As can be seen in FIG. 6, the polymers utilized in the invention show a greater response to radiation relative to LDPE as measured by levels of torque.

While the present invention has been described and illustrated by reference to particular embodiments thereof, it will be appreciated by those of ordinary skill in the art that the invention lends itself to variations not necessarily illustrated herein. For instance, the polymers useful in this invention can be made using mixed transition metal metallocene catalyst systems. Also, the metallocene catalyst systems of this invention can include non-cylopentadienyl catalysts components, or ancillary ligands such as boroles or carbollides in combination with a transition metal. For this reason, then, reference should be made solely to the appended claims for the purposes of determining the true scope of this invention.

What is claimed is:

1. A process for producing a wire or cable comprising a conductor and an insulating layer, said insulating layer comprising a polymer selected from the group consisting of ethylene polymerized in the presence of a metallocene catalyst system with at least one comonomer selected from the group consisting of $C_3$ to $C_{20}$ alpha-olefins and $C_3$ to $C_{20}$ polyenes, the polymer having a density in the range of about 0.87 g/cm$^3$ to about 0.96 g/cm$^3$, a melt index in the range of about 0.2 dg/min. to about 100 dg/min., a molecular weight distribution in the range of about 1.7 to about 10, and a composition distribution breadth index (CDBI) greater than about 45 percent, said process comprising:

crosslinking said polymer.

2. The process of claim 1 wherein the polymer is crosslinked with a crosslinking agent.

3. The process of claim 2 wherein the crosslinking agent is a peroxide.

4. The process of claim 3 wherein the peroxide is used in the amount of 1 to 5 weight percent based on the total weight of the polymer and wherein the wire or cable has a rheometer torque greater than 40 in-lb.

5. The process of claim 3 wherein the peroxide is dicumyl peroxide.

6. The process of claim 1 wherein the polymer is crosslinked by radiation.

7. The process of claim 6 wherein the radiation dosage is between 4 and 20 mrad and wherein the wire or cable has a rheometer torque greater than 10 in-lb.

8. The process of claim 1 wherein the process comprises a step of introducing a filler.

9. The process of claim 1 wherein the polymer has CDBI greater than 50%.

10. The process of claim 1 wherein the comonomer is 1-hexene or 1-octene.

* * * * *